Dec. 27, 1966  G. LANGER ET AL  3,294,704
APPARATUS FOR ELECTROSTATIC ENCAPSULATION
Original Filed Aug. 2, 1962
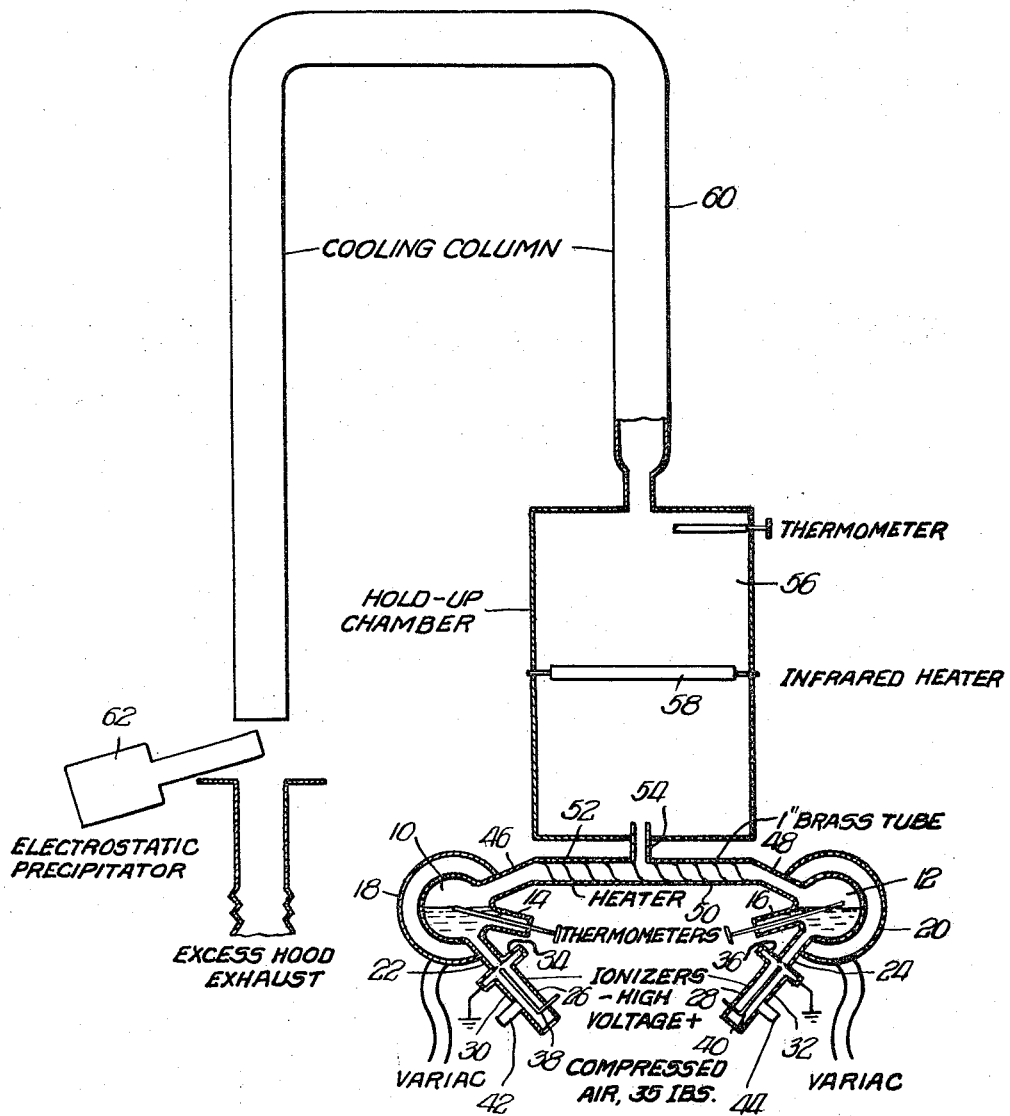
INVENTOR.
GERHARD LANGER
GEORGE YAMATE
BY

United States Patent Office 3,294,704
Patented Dec. 27, 1966

3,294,704
APPARATUS FOR ELECTROSTATIC
ENCAPSULATION
Gerhard Langer, Downers Grove, and George Yamate, Chicago, Ill., assignors, by mesne assignments, to IIT Research Institute, Chicago, Ill., a not-for-profit corporation of Illinois
Original application, Aug. 2, 1962, Ser. No. 214,377, now Patent No. 3,159,874, dated Dec. 8, 1964. Divided and this application Oct. 2, 1964, Ser. No. 404,548
8 Claims. (Cl. 252—359)

This application is a division of our copending application, Serial No. 214,377, filed August 2, 1962, now Patent No. 3,159,874.

This invention relates in general to an encapsulation apparatus and in particular to apparatus for encapsulating minute particles within a coating of an encapsulating substance.

In accordance with this invention encapsulation apparatus is provided wherein aerosol particles in the submicron and micron range are encapsulated by an encapsulating substance for the purpose of protecting the encapsulated material from the external environment and for the purpose of reducing the encapsulated substance to a fine powder which is readily transported and stored. Encapsulation of an encapsulable material by an encapsulating substance can be accomplished by separately forming aerosols of the material to be encapsulated and the encapsulating substance and mixing the materials to be encapsulated with the encapsulating substance so as to cause the collision and ultimate surrounding by the encapsulating substance around the material to be encapsulated. This can be accomplished by directing aerosol streams of material to be encapsulated into aerosol streams of encapsulating substance with the result that certain of the particles to be encapsulated will collide with the encapsulating substance to thereby form the resultant desired particles which will be composed of the material to be encapsulated surrounded by the encapsulating substance.

It has been proposed in co-pending patent application of Berger et al., Serial No. 148,574, filed on October 30, 1961, now Patent No. 3,208,951, and assigned to the same assignee, that aerosol encapsulation be performed through the use of electrostatic charging of the material to be encapsulated and the encapsulating substance and to charge the material to be encapsulated with a charge opposite to the charge on the encapsulating substance. In the previously identified patent application a specific type of electrostatic atomization was disclosed and this type of atomizing or forming of aerosol particles with a predetermined charge thereon was utilized to prevent the formation of free ions that would accompany the charged aerosol particles. It was observed that if a number of ions were produced at the same time that the charged aerosol particles were produced and were permitted to accompany the charged aerosol particles into the coagulating region, that is, the space wherein the oppositely charged aerosol particles are directed for collision, that these ions would have an undesired and noticeable neutralizing effect on the aerosol particles charged with the opposite sign.

Further, it was observed that there would be a greater coagulation of oppositely charged aerosol particles if the kinetic energy of the aerosol particles was reduced; in other words, the higher the velocity of the cloud or stream of aerosol particles, the lower the collision or coagulation rate, and consequently the less encapsulation that would occur.

Also, it was observed that the presence in the coagulating region of the lines of force of the electrostatic field used to charge the aerosol particles had a detrimental affect upon the collision or coagulation rate of the aerosols.

Previously it was believed that charging aerosols through the use of a corona discharge device was inadvisable inasmuch as an excess of ions also would be produced which eventually would have a neutralizing effect in the coagulating or collision chamber thereby reducing the efficiency of the encapsulation process. It also was believed that pneumatic atomization, or pneumatic aerosol generation, would result in aerosol particles possessing an undesired quantity of kinetic energy which would reduce the probability of the charged aerosols colliding with one another in the coagulating chamber.

It is an object of this present invention to provide apparatus for causing the encapsulation of an aerosol material in an encapsulating substance.

Another object of this invention is to provide apparatus for the encapsulation of aerosol material in an aerosol encapsulating substance wherein the material being encapsulated and the encapsulating substance are charged with opposite electrostatic charges in isolated chambers before they are mixed for collision or coagulation.

It is another object of this invention to provide apparatus for the encapsulation of material to be encapsulated by an encapsulating substance wherein oppositely charged aerosol particles comprising material to be encapsulated and the encapsulating substance are formed through the use of individual corona discharge devices.

It is another object of this invention to provide apparatus for the encapsulation of a material to be encapsulated by an encapsulating substance wherein oppositely charged aerosol particles of material to be encapsulated and encapsulating substance are formed through the use of a pneumatic aerosol generator.

It is another object of this invention to provide apparatus for the generation of aerosols of a given charge wherein a combined corona discharge device and a pneumatic aerosol forming device is utilized to provide the charged aerosols.

Another object of this invention is to provide apparatus for encapsulating a material to be encapsulated in an encapsulating substance wherein the material to be encapsulated and the encapsulating substance are formed into oppositely charged aerosol particles which are directed to a collision or coagulation region and then subsequently to a cooling chamber and a collection station where the encapsulated end product is withdrawn from the system.

Briefly, in a preferred embodiment of the invention liquid material to be encapsulated is formed into charged aerosol particles in the submicron and micron range in a first chamber and a liquid encapsulating substance is formed in a second separate chamber into oppositely charged aerosol particles in the submicron and micron range. The oppositely charged aerosol particles to be encapsulated and the encapsulating particles are permitted to enter a coagulation or collision region wherein the oppositely charged aerosol particles collide with one another to form the resultant encapsulated end product. Next, the encapsulated end products are permitted to cool to enable the encapsulating liquid to return to its normal solid state. Finally, the aerosol particles are delivered to a collector where the coagulated particles are removed from the system.

The charged aerosol particles are formed in the first and second chambers through the use of a combination corona discharge device and pneumatic aerosol forming apparatus. The liquid material to be encapsulated and liquid encapsulating substance are maintained in the liquid state if necessary by means of heating coils. A pair of corona discharge devices adapted to emit streams of charged ions are positioned contiguous with said first and second chambers and in contact with the liquid material to be encapsulated and the encapsulating substances, respectively.

A stream of compressed air enters the corona discharge device at a comparatively high velocity and passes through the area of corona discharge where copious ions are formed in the air stream. The air stream then impinges and penetrates into the liquid material to be encapsulated in one of the aforementioned chambers and into the encapsulating substance in the other of the two aforementioned chambers wherein the force of the air stream causes aerosol particles in the submicron range to be formed in the first and second chambers, respectively. At the same time that the aerosol particles are being formed in the first and second chambers these aerosol particles are charged by diffusion by the stream of ions accompanying the air stream. In other words, the free ions leaving the corona discharge device are deposited on the liquid drops being formed into aerosols. In the preferred embodiment of the invention heat is applied to the materials being encapsulated and the encapsulating substance for the purpose of insuring that the encapsulating material is in a liquid state and also so that all the aerosol particles will be approximately at the same temperature so that there will be no heat exchange between the aerosol particles as they collide with one another thereby enabling the encapsulating substance to more readily form around the material being encapsulated.

Other advantages, objects and features of this invention will be more clearly understood if the following is viewed in light of the accompanying drawing wherein a preferred embodiment of the encapsulation apparatus is diagrammatically illustrated.

Referring now to the drawing, there is illustrated a system for forming and collecting an encapsulated end product comprising an encapsulated liquid aerosol falling in the submicron or micron range and an encapsulating substance preferably forming a solid covering under normal atmospheric conditions for the encapsulated liquid aerosol so that the collected end product is dry to the touch and can be handled and stored as a fine dry powder.

There is illustrated a pair of three-neck round glass flasks 10 and 12, positioned as shown and containing the material to be encapsulated and the encapsulating substance, respectively. The three-neck flasks 10 and 12, which in one embodiment of the invention were 500 milliliter flasks, are positioned as illustrated in the drawing and the center necks 14 and 16 of the flasks 10 and 12, respectively, have thermometers positioned therein, and the necks 14 and 16 are sealed so that the liquid contained within the flasks 10 and 12 cannot flow out through the necks 14 and 16, respectively.

A pair of heating mantles 18 and 20 are wrapped around the glass flasks 10 and 12, respectively.

It is desired to have the material to be encapsulated and the encapsulating substance in the liquid state. It also is preferred that after the material to be encapsulated has been encapsulated by the encapsulating substance that the encapsulating substance then harden to a solid. Therefore, in some instances, it will be necessary to heat the encapsulating substance until it is in a liquid state before the encapsulating process is begun.

It also is desired to have the material to be encapsulated and the encapsulating substance at approximately the same temperature. Therefore, even though the substance or materials being encapsulated may be originally in a liquid form, it also is heated if the encapsulating substance is heated so as to be at the same temperature as the encapsulating substance.

The heating mantles 18 and 20 contain heat producing resistance wires and can be of any type known to those skilled in the art. The heat emanated from the heating mantles 18 and 20 and consequently the temperature of the materials being encapsulated in the encapsulating substance can be manually adjusted by variable power supplies (not shown).

Connected to the lower necks 22 and 24 of the round flasks 10 and 12, respectively, are a pair of ionizers 26 and 28, respectively. The ionizers 26 and 28 comprise elongated cylindrical plastic tubes 30 and 32, respectively, having attached to the upper ends thereof brass caps 34 and 36, respectively. The brass caps 34 and 36 are secured to the tubes 30 and 32 in any desired manner and each is provided with a small hole in the center such as that hole produced by a number 60 or number 65 drill. The comparative size of the holes is exaggerated for purposes of clarity in the drawing. Axially positioned in the tubes 30 and 32 are a pair of tungsten rods 38 and 40, respectively. The tungsten rods 38 and 40 can be supported in any suitable manner known in the art and the upper ends of the tungsten needles 38 and 40 are sharpened to a very fine point and are positioned coaxially adjacent the above-mentioned small holes in the brass caps 34 and 36.

A direct current power source (not shown) is connected across the cap 34 and the tungsten rod 38 in the ionizer 26 thus providing a corona forming direct current potential between the edges of the hole in the cap 34 and the tip of the tungsten rod 38. Another direct current power source is connected across the cap 36 and the tungsten rod 40 of the ionizer 28, also providing a corona forming direct current potential between the edges of the hole in the cap 36 and the tip of the tungsten rod 40. Direct current is utilized inasmuch as it is desired to produce aerosol particles of the same charge in the ionizer 26 and of the opposite charge in the ionizer 28. The potential of the power source must be sufficient to cause a corona discharge field between the cap 34 and tungsten needle 38 and the cap 36 and the tungsten needle 40 of the ionizers 26 and 28, respectively. To produce aerosol particles of opposite charges in the respective flasks the potential across ionizer 26 is oppositely polarized to that across ionizer 28.

The tungsten needles 38 and 40 are positioned so close to their associated caps 34 and 36 that an arcing would occur, if it were not for the fact that a stream of air is passing between the above-mentioned tungsten needles and their associated plates. A source of compressed air (not shown) is connected to ionizer 26 at the inlet 42 and another source of compressed air (not shown) is connected to the ionizer 28 at the inlet 44. In one particular embodiment of the invention 35 pounds of compressed air was connected to both the inlet 42 and the inlet 44.

The ionizers 26 and 28 can be connected to the necks 22 and 24 of the round flasks 10 and 12, respectively, by any means known in the art such as, for example, Tygon tubing. The upper necks 46 and 48 of the round flasks 10 and 12, respectively, are each connected to one end of tube 50 and these couplings can be made of Tygon tubing also. Tube 50 in one particular embodiment in the invention is a one-inch brass tube. Heating tape 52 is diagrammatically illustrated as being wound about the tube 50 and the heating tape 52 has heating wires embedded therein and the purpose thereof is to maintain the material to be encapsulated and the encapsulating substance in liquid states and also at approximately the same temperatures.

The heating tape 52 is connected to a power source (not shown) and the power source can be provided with manual controls for adjusting the amount of heat released from the heating tape 52. Connected to the brass tube 50 at the center portion thereof is a small mixing tube 54, which is of a smaller diameter than the brass tube 50 and which, in one embodiment of the invention, is a ⅜ inch diameter copper tubing. The aerosol particles emanating from the round flasks 10 and 12 move through the pipe 50 and up through the mixing tube 54 and because of the reduced diameter of the mixing tube 54 are in close proximity with one another. The mixing tube 54 leads into the hold-up chamber 56. In one preferred embodiment of the invention the hold-up chamber 56 is a plastic cylinder approximately 18 inches in height and 12 inches in diameter and is provided with an infra-red heater 58 to maintain the aerosol particles in their liquid state and at approximately the same temperature.

The purpose of the hold-up chamber 56 is to enable the oppositely charged aerosol particles to collide or congeal before they are cooled and collected in the latter part of the system. Inasmuch as the aerosol particles are heated a natural convection is provided and the aerosol particles, after collision and coagulation, flow into the cooling column 60. The cooling column 60 in one embodiment of the invention is a Pyrex tube approximately 4 inches in diameter and is U-shaped as seen in the drawing. The coagulated aerosol particles then pass through the cooling column 60 which can be cooled by the atmosphere or by any desired means. This enables the encapsulating substance, which is in the liquid form during the coagulation period, to harden to a solid form under atmospheric conditions. Thereafter, the coagulated particles pass to the collection station 62 in the system where in this particular embodiment of the invention the coagulated particles are precipitated for collection by an electrostatic precipitator which can be of any commercial type and, for example, can be the well-known Cottrell type of precipitator.

OPERATION

Initially, material to be encapsulated is placed in the three-neck round flask 12 and an encapsulating substance is placed in the three-neck round flask 10. If, for example, the material to be encapsulated is glycerin and the encapsulating material is a wax, the wax itself will not be in a liquid state under atmospheric conditions and must be heated until it is in a liquid state. The heat is provided by heating mantle 18 and can be manually adjusted to a desired temperature. As previously stated, it is preferable to have the material to be encapsulated also at the same temperature and this can be done by adjusting the output of heating mantle 20 associated with the round flask 12. A source of compressed air is connected to the input 42 and to the input 44 of the ionizers 26 and 28, respectively, as previously stated, and a stream of air passes into ionizer 26 and another stream of air passes into ionizer 28, and up through and out through the small holes provided in the caps 34 and 36 of the ionizers 26 and 28, respectively. These streams of air pass through the strong electric fields existing between the end of the tungsten needle 38 of the ionizer 26 and the tungsten needle 40 of the ionizer 28 and their associated caps 34 and 36, respectively. The tungsten needles 38 and 40 are positioned so close to their associated plates 34 and 36 that a natural arcing would occur if it were not for the fact that a stream of air is passing between these elements. The potentials applied across the tungsten needles 38 and 40 and their associated caps 34 and 36 must be sufficiently great to create an electric field exhibiting the corona discharge effect. Air passing between the tungsten needles and their associated plates is ionized and, therefore, the output of the ionizer 26 and the ionizer 28 is a stream of air having a copious amount of ions provided therein.

The holes in the caps 34 and 36 are so small that the problem of the wax, for example, under operating conditions leaking into the ionizer 26 from the flask 10 and the glycerin in the flask 12 leaking into the ionizer 28 does not occur. If the system is to be turned off it is desirable to remove the ionizers from their contiguous position with respect to the wax and glycerin before the stream of air is cut off.

The streams of air carrying the copious ions passes into the wax in the flask 10 and into the glycerin in the flask 12 and this high velocity stream creates agitation in flasks 10 and 12 thereby providing large amounts of aerosol particles in the submicron and micron ranges. In one particular embodiment of the invention the particle size fell into the range of one-tenth to two microns. No difficulty is envisioned in creating aerosol particles falling into other ranges inasmuch as this can be accomplished by varying the parameters of the systems such ast the hole size in caps 34 and 36, the velocity of the streams of air and so on.

It is not desired that the aerosol particles which are formed possess high kinetic energy. Therefore, the ionizers 26 and 28 are arranged as illustrated in the drawing, that is, pointed away from the intended direction of movement of the aerosol particles. Therefore, if the aerosol particles emerging from the liquids in flasks 10 and 12 have an excess of energy some of that energy will be dissipated in the flasks 10 and 12, respectively, by bouncing off various surfaces of the flasks 10 and 12. Also, if any comparatively large drops of the liquid are propelled out of the liquid they would normally bounce back into the liquid or settle back into the liquid because of the arrangement of flasks 10 and 12. Also, the pressure of the compressed air can be lowered if the agitation is too great and also the amount of liquid in flasks 10 and 12 can be increased. After the aerosol particles have been formed, a slight pressure head from the streams of air forming the aerosol particles causes the movement of the aerosol particles into tube 50 from the flasks 10 and 12, and into the mixing tube 54 where the particles having opposite charges have an opportunity to mix and be dispersed and even to collide or to coagulate.

The clouds of the aerosol particles then enter the hold-up chamber 56 where they are given a further opportunity for collision or coagulation, and from the hold-up chamber 56, the aerosol particles travel into and through the cooling column 60 to the electrostatic precipitator 62 wherein the encapsulated particles are collected.

It has been observed that even when the ionizers 26 and 28 do not have any potential applied between their respective tungsten needles and plates that a certain amount of coagulation takes place. It is postulated that the pneumatic or jet method of atomizing the wax and glycerin liquid itself produces charges on the aerosol particles. However, the coagulation is greatly increased when a corona potential is applied to the ionizers 26 and 28.

What has been described is believed to be the preferred embodiment of the invention and many alterations and modifications can be made therein without departing from the scope of the invention and it is intended that the appended claims be limited only by the prior art.

What is claimed is:

1. Apparatus for forming charged aerosol particles comprising: a reservoir containing a liquid substance; and first means for injecting a stream of gas, containing ions into said liquid substance; said first means comprising, means for creating an electric field of high enough intensity to produce corona, and means for passing a stream of gas through said electric field whereby ions are formed in said gas as it passes through said corona; whereby the passage of said stream through said liquid substance causes the release therefrom of charged aerosol particles.

2. Apparatus for forming charged aerosol particles comprising: a reservoir containing a liquid substance; and first means for injecting a stream of gas, containing ions into said liquid substance; said first means comprising a chamber having a first and second electrode, said first electrode having a hole formed therein and said second electrode positioned so that a corona is formed when a predetermined potential is applied to said electrodes, and means for passing a stream of gas through said electric field and said hole whereby ions are formed in said gas as it passes through said electric field; whereby the passage of said stream through said liquid substance causes the release therefrom of charged aerosol particles.

3. Apparatus for forming charged aerosol particles comprising: a reservoir containing a liquid substance; and a generator of a stream of ionized gas positioned contiguous with said liquid comprising an enclosure positioned contiguous with said liquid, a first electrode and second electrode, said first electrode in contact with said liquid and having a hole formed therein, said second electrode positioned close enough to and coaxial with said hole so as to enable a corona to be formed under operating circumstances when a predetermined potential is applied to said electrodes, and means connected to said enclosure for delivering a stream of air into said enclosure and between said electrodes and through said hole into said liquid; whereby charged aerosol particles are released from said liquid substance.

4. Apparatus for forming unipolar aerosol particles comprising: a reservoir containing a liquid substance; and a generator of a stream of ionized gas positioned contiguous with said liquid comprising an enclosure positioned contiguous with said liquid, a first electrode and a second electrode, said first electrode in contact with said liquid and having a hole formed therein, said second electrode positioned close enough to and coaxial with said hole so as to enable a corona to be formed under operating circumstances when a predetermined direct current potential is applied to said electrodes, and means connected to said enclosure for delivering a stream of air into said enclosure and between said electrodes through said corona and said hole into said liquid; whereby charged aerosol particles are released from said liquid substance.

5. Apparatus for forming charged aerosol particles comprising: a reservoir containing a liquid substance; and a generator of a stream of ionized gas positioned contiguous with said liquid comprising an enclosure positioned contiguous with said liquid, a first electrode and a second electrode, said first electrode in contact with said liquid and having a hole formed therein, said second electrode positioned close enough to and coaxial with said hole so as to enable a corona to be formed under operating circumstances when a predetermined potential is applied to said electrodes, means connected to said enclosure for delivering a stream of air into said enclosure and between said electrodes and through said hole into said liquid; said second electrode positioned close enough to said hole so that arcing would occur if said predetermined potential was applied to said electrodes when no stream of air was passed between said electrodes.

6. Apparatus for forming charged aerosol particles comprising: a reservoir containing a body of a liquid substance; said reservoir having an input below said body and an output above the top level of said body; and first means for directing a stream of gas, containing ions into said input and up and through said liquid substance; whereby charged aerosol particles are released from said liquid substance.

7. Apparatus for forming charged aerosol particles comprising a liquid reservoir containing a body of liquid, said reservoir having an input opening below the level of said body of liquid and a discharge opening above the level of said body of liquid, means associated with said reservoir for forming ionized gas, and means for injecting a stream of ionized gas under pressure into said input opening, whereby the passage of said stream through said body of liquid causes the release of charged aerosol particles from said body of liquid and out through said discharge opening.

8. Apparatus for forming charged aerosol particles comprising a reservoir containing a body of liquid, said reservoir having an input opening below the level of said body of liquid and a discharge opening above the level of said body of liquid, means connected to and external of said reservoir for forming ionized gas, and means connected to and external of said reservoir for injecting a stream of ionized gas under pressure through said input opening and into said body of liquid, whereby the passage of said stream through said body of liquid causes the release of charged aerosol particles from said body of liquid and out through said discharge opening.

References Cited by the Examiner

UNITED STATES PATENTS

| | | | |
|---|---|---|---|
| 398,327 | 2/1889 | DeVara | 317—3 X |
| 2,049,940 | 8/1936 | Barthel | 317—3 X |
| 2,551,582 | 5/1951 | Carlson | 317—3 X |
| 2,753,796 | 7/1956 | Wood et al. | 317—3 X |

FOREIGN PATENTS

| | | |
|---|---|---|
| 1,019,822 | 1/1953 | France. |

NORMAN YUDKOFF, *Primary Examiner.*

J. SOFER, *Assistant Examiner.*